US010649976B1

(12) United States Patent
Acheson et al.

(10) Patent No.: US 10,649,976 B1
(45) Date of Patent: May 12, 2020

(54) USING A GLOBAL SEQUENCE NUMBER FOR REPLICATING MUTATING DATA

(71) Applicant: Amazon Technologies, Inc., Seattle, WA (US)

(72) Inventors: Alazel Acheson, Redmond, WA (US); Christopher Andrew Stephens, Issaquah, WA (US); Seth William Markle, Seattle, WA (US); Subhakanta Kar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 712 days.

(21) Appl. No.: 14/975,198

(22) Filed: Dec. 18, 2015

(51) Int. Cl.
*G06F 7/00* (2006.01)
*G06F 16/23* (2019.01)
*H04L 12/721* (2013.01)
*G06F 16/27* (2019.01)

(52) U.S. Cl.
CPC ...... *G06F 16/2365* (2019.01); *G06F 16/2358* (2019.01); *G06F 16/27* (2019.01); *H04L 45/14* (2013.01)

(58) Field of Classification Search
CPC .................................................. G06F 16/955
See application file for complete search history.

(56) References Cited

U.S. PATENT DOCUMENTS

| 7,752,064 | B2 * | 7/2010 | Kauffman | G06Q 10/06 705/7.26 |
|---|---|---|---|---|
| 7,836,015 | B1 * | 11/2010 | Mills | H04L 67/1095 707/613 |
| 8,594,948 | B2 * | 11/2013 | McGlennen | G06F 19/3418 702/19 |
| 9,208,032 | B1 * | 12/2015 | McAlister | G06F 11/1471 |
| 9,959,062 | B1 * | 5/2018 | Piszczek | G06F 3/0611 |
| 2002/0133570 | A1 * | 9/2002 | Michel | H04L 29/12009 709/219 |
| 2003/0014379 | A1 * | 1/2003 | Saias | G06Q 10/06 706/45 |
| 2008/0016476 | A1 * | 1/2008 | Chan | G06F 17/5068 716/122 |
| 2008/0016483 | A1 * | 1/2008 | Chan | G06F 17/5068 716/122 |
| 2009/0300570 | A1 * | 12/2009 | Chan | G06F 17/5068 716/119 |
| 2010/0010996 | A1 * | 1/2010 | Petrocelli | G06F 17/30067 707/E17.01 |
| 2014/0279931 | A1 * | 9/2014 | Gupta | G06F 16/2358 707/683 |

* cited by examiner

*Primary Examiner* — Eliyah S. Harper
(74) *Attorney, Agent, or Firm* — Lee & Hayes, P.C.

(57) ABSTRACT

Routing data is copied from a primary data store to a local data store of a computing device. As the routing data is being copied by the computing device, changes to the data continue to occur. After copying all or a portion of the data, the computing device uses a value of a global sequence number (GSN) to determine if mutations have been made to the primary data. The routing data in the local data store is not consistent with the routing data stored in the primary data store when the value of the GSN is larger after the copying of the routing data as compared to the initial value of the GSN when the copying started. When changes have been made to the data, the computing device integrates the changes into the local data store before beginning routing operations.

20 Claims, 7 Drawing Sheets

US 10,649,976 B1

USING A GLOBAL SEQUENCE NUMBER FOR REPLICATING MUTATING DATA

BACKGROUND

Computer applications rely on data to be accurate when performing various operations. When the data is not accurate, the computer applications relying on that data will produce inaccurate results. In some cases, more than one computing device may rely on the data maintained by a common data source.

Ensuring that the data is consistent and accurate across more than one computing device can be challenging. For example, ensuring that multiple computing devices each have a consistent view of data used by a common application can be difficult. To exacerbate this problem, data may be mutating while a computing device is attempting to obtain a copy of the data.

DETAILED DESCRIPTION

Figure 1:
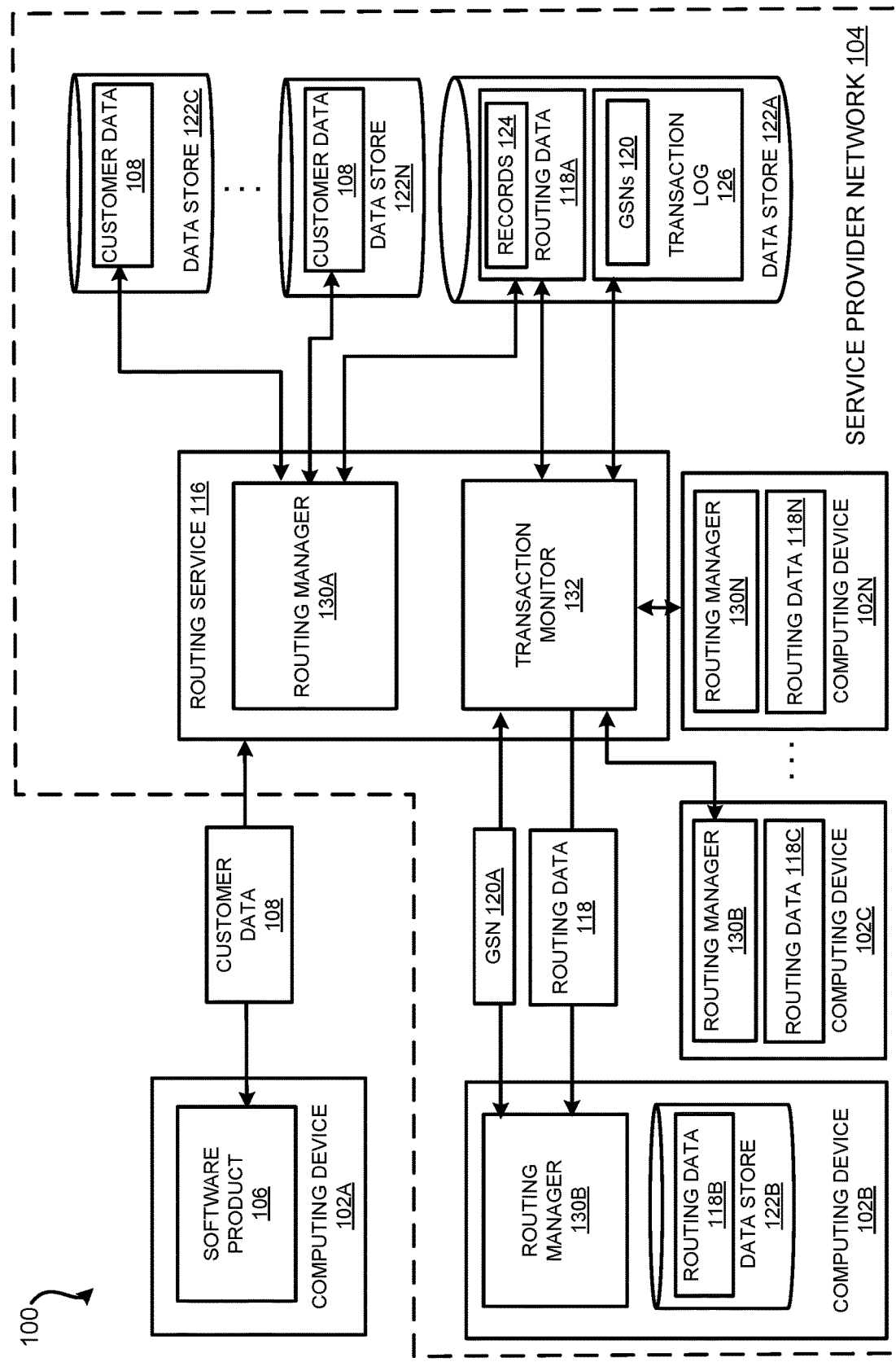
FIG. 1 is a computing system architecture depicting an illustrative operating environment in which a global sequence number is used for replicating mutating data.

The following detailed description is directed to technologies for using a global sequence number (GSN) for replicating mutating data. Using techniques described herein, a computing device creates a local copy of data within a local data store that is consistent with the data maintained by a primary computing device in a primary data store. Data that is consistent can refer to data that has the same value within the local data store and the primary data store. As used herein, a GSN can be a number that is incremented, decremented, or otherwise modified with each change made to the source data.

In some cases, the data being copied may be too large to copy in a single transaction without causing a performance delay for other computing devices or software products accessing the data. According to some examples, in an attempt to reduce performance delays, the computing device copies portions of the data (which may be referred to herein as "chunks") until all of the data is copied. A "chunk" may be a predetermined size, such as 1K, 10K, 128K, and the like or dynamically determined during the copying.

In some configurations, the data copied is structured data. Generally, structured data is organized and follows a particular organized structure. For instance, in some cases, the data may be hundreds of gigabytes (GBs) of data arranged as records within a table. According to some configurations, each record that is stored in the table is associated with a global sequence number that identifies a position of the transaction relative to other records stored within the data store. In some examples, the data is routing metadata that identifies how to route data to one or more network locations and the computing device copying the data uses the local copy of the data to perform routing operations.

As briefly discussed above, in some cases, more than one computing device may utilize data when performing operations. For example, in the case of routing data, more than one computing device (e.g., replication servers) may be utilized by a routing service to route data from one location to another location. Before an additional computing device is used by the routing service, the computing device obtains a local copy of the data stored in the primary data store. In some examples, the computing device breaks up the data stored into the primary data store into portions of data (which may be referred to herein as "chunks") when replicating the data to the local data store.

After copying all or a portion of the data, the computing device identifies mutations to the data that have been made to the data. A "mutation" to the data can refer to any change to the data. For example, as data including a number of records is being copied by the computing device to the local data store, one or more of the records within the data can modified by some other computing device or software product. Without integrating the changed record into the copied data, the computing device would use an out of date copy when performing operations that rely on the data. For example, routing determinations made using inconsistent routing data would result in incorrect routing of data.

According to some examples, the GSN is used when determining whether the local copy of the data is consistent with the primary data. In some configurations, a value of the global sequence number is increased on each mutation made to the data within the primary data store. For example, a transaction monitor that is monitoring mutations to the routing metadata may change (e.g., incremented, decremented, or otherwise modified) the value of the global sequence number each time a change is made to one of the records.

Before a computing device begins copying the data, the computing device may obtain the value of the global sequence number from the transaction log. The value of the GSN before copying the data provides an initial state of the data. After obtaining the value of the GSN, the computing device begins copying the data from the primary data store to a local data store. As discussed above, the data may be copied in chunks. After copying all or a portion of the data, the computing device may obtain a current value of the GSN.

The computing device may compare the initial value of the GSN with the current value of the GSN to determine whether the records in the chunk are consistent with the records stored in the primary data store. When the initial value of the GSN is the same as the current value of the GSN the data is consistent. When the initial value of the GSN is not the same as the current value of the GSN, one or more mutations were made to the data during the copying.

If there were mutations made to the data then the computing device obtains, from the transaction log, the records, or changes to the records, that were mutated since the initial value of the GSN. The computing device then applies the changes to the mutated records stored within the local data store. In some examples, the changes obtained from the transaction log include the changes from the initial value of the GSN plus one until the end of the transaction log. This configuration can help to ensure that the local copy of the data is consistent with the data stored by the primary data store. Additional details regarding the various components and processes described above for using a global sequence number for replicating mutating data will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

FIG. 1 is a block diagram depicting an illustrative operating environment 100 in which a global sequence number is used for replicating mutating data. As illustrated in FIG. 1, the operating environment 100 includes one or more computing devices 102 in communication with a service provider network 104 or some other distributed computing network.

A user may interact with the service provider network 104 using a computing device 102, such as the computing device 102A. The computing device 102A may be a computer, such as a desktop or a mobile computing device (e.g., a tablet or smartphone computing device). In some configurations, the computing device 102A may be connected to a television or some other display device. For instance, the computing device may be a dongle device that connects to a port of a television.

According to some examples, an application, such as a software product 106 executing on the computing device 102A communicates with the service provider network 104. As used herein, the term "software product" may refer to software and/or software services. For example, a software product may be an application, a machine image, or software as a service ("SaaS"). The software product may be available from an electronic marketplace and may be executed on a customer computing device and/or within a service provider network or some other network.

In other examples, the software product 106 may be executed within the service provider network (not shown) on behalf of the user. For example, the software product 106, may be executed on computing resources provided by the service provider network 104. The user of a computing device 102 may be a customer of the service provider network. As used herein, the terms "customer" and "customers" refer to existing customers of the service provider network 104 as well as visitors (i.e. potential customers) of the service provider network 104.

As described in more detail below, the service provider network 104 may include a collection of rapidly provisioned and, potentially, released computing resources hosted in connection with the electronic marketplace or a third party provider. The computing resources may include a number of computing, networking and storage devices in communication with one another. In some examples, the computing resources may correspond to physical computing devices. In other examples, the computing resources may correspond to virtual machine instances implemented by one or more physical computing devices. In still other examples, computing resources may correspond to both virtual machine instances and physical computing devices.

As illustrated, the service provider network 104 includes a routing service 116, computing devices 102B-102N (e.g., servers) and data stores 122A-122N. While a service provider network 104 is illustrated, other types of distributed computing networks may be utilized. Further, while a routing service 116 is illustrated, other services and/or software products may use techniques described herein for helping to ensure that copied data is consistent with the data stored in a primary data store.

As discussed briefly above, a computing device 102B may use a value of a GSN 120 when replicating data, such as routing data 118, from a primary data store 122A to a local data store 122B to help ensure that the copied data is consistent. In some cases, the routing data 118 being copied from the data store 122A is too large to copy in a single transaction without causing a performance delay for other computing devices or components (e.g., computing devices 102C-102N or the routing manager 130A) accessing the data. For instance, in some cases, the routing data 118 may be hundreds of gigabytes (GBs) (or more or less) of data arranged as records within a table. According to some examples, in an attempt to reduce performance delays, the computing device 102B copies chunks of the routing data 118 until all of the data is copied. A "chunk" may be a predetermined size, such as 1K, 10K, 128K, and the like or dynamically determined during the copying. For instance, the routing manger 130B may determine a size of the routing data 118 and divide the routing data into chunks.

According to some configurations, each record 124 that is stored in the routing data 118 is associated with a global sequence number 120 that identifies a position of the transaction relative to other records stored within the routing data 118 of the data store 122A. In some examples, the transaction monitor 132 monitors changes to the routing data 118.

In response to detecting a change, the transaction monitor 132 updates the value of the GSN 120 and stores the value within the data store 122A. For example, the value of the GSN may be stored with each change recorded in the transaction log data 118C. In other examples, the GSN may be stored separately from the transactions, such as in a table that associated each value of a GSN with the associated transaction.

As briefly discussed, more than one computing device may utilize data when performing operations. For example, in the case of routing data, more than one computing device (e.g., computing devices 102B-102N) may be utilized by the routing service 116 to route data from one location to another location. In some examples, the routing manager 130A, or one or more of the other computing devices 102B-102N that includes a local copy of the routing data 118B, routes customer data 108 received from a computing device 102A and other computing devices.

Before an additional computing device, such as any of computing devices 102B-102N, is used by the routing service 116 to perform routing operations (or other operations that utilize the routing data 118), the computing device replicates a copy of the routing data 118A. As illustrated, the computing device 102B copies the routing data 119A from the data store 122A to create a local copy of the routing data 118B within the local data store 122B.

After copying all or a portion of the data, the computing device 102B identifies mutations to the routing data 118A stored on the data store 122A. For example, as the routing data 188 is being copied by the computing device to the local data store, one or more of the records within the data can modified by the routing service 116 and/or some other computing device or software product. Without integrating the change to the record into the copied routing data 118B, the computing device 102B would use an out of date copy when performing routing operations that rely on the data.

According to some examples, values of the GSN 120 are used when determining whether the local copy of the routing data 118B is consistent with the primary copy of the routing data 118A. In some configurations, a value of the global sequence number is increased on each mutation made to the data within the primary data store. For example, a transaction monitor 132 can increase the value of the global sequence number 120 each time a change is made to one of the records. In some configurations, the transaction monitor 132 monitors changes made to records 124 within the routing data 118A and records the changes to the transaction log data 126.

Before the computing device 102B begins copying the routing data 118A from the data store 122A, the computing device 102B can obtain the current value of the GSN 120 from the transaction log 126 via the transaction monitor 132. The value of the GSN before copying the data provides an initial state of the data. After obtaining the value of the GSN 120B, the computing device 102B begins copying the routing data 118A. As discussed above, the routing data 118A may be copied in chunks.

As the routing data 118A is received by the routing manager 130B, the routing manager 130B can store a local copy of the routing data as routing data 118B. After copying all or a portion of the data, the computing device 102B may obtain a current value of the GSN. In some examples, each record that is included within the routing data 118A may include an associated GSN. In other examples, the routing manager 130B can query the transaction monitor 132 to obtain a current value of the GSN 120. Generally, an initial value of the GSN 120 is determined before the routing data 118A is copied and an ending value of the GSN 120 is determined after the routing data 118A is copied by the computing device 102B.

According to some configurations, the computing device 102B may compare the initial value of the GSN 120 with the current value of the GSN 120 to determine whether the records in the routing data 118B are consistent with the records stored in the routing data 118A. When the initial value of the GSN 120 is the same as the current value of the GSN 120, the data is consistent. When the initial value of the GSN 120 is not the same as the current value of the GSN 120, one or more mutations were made to the routing data 118A during the copying.

If there were mutations made to the routing data 118A then the routing manager 130B on the computing device 130B obtains the records, or changes to the records, from the transaction log 126 via the transaction monitor 132. In some examples, the changes obtained from the transaction log data 126 include the changes from the initial value of the GSN plus one until the end of the transaction log. As mentioned above, this can help to ensure that the local copy of the data is consistent with the data stored by the primary data store. The computing device 102B then applies the changes to the records stored within the local data store 122B.

Figure 2:
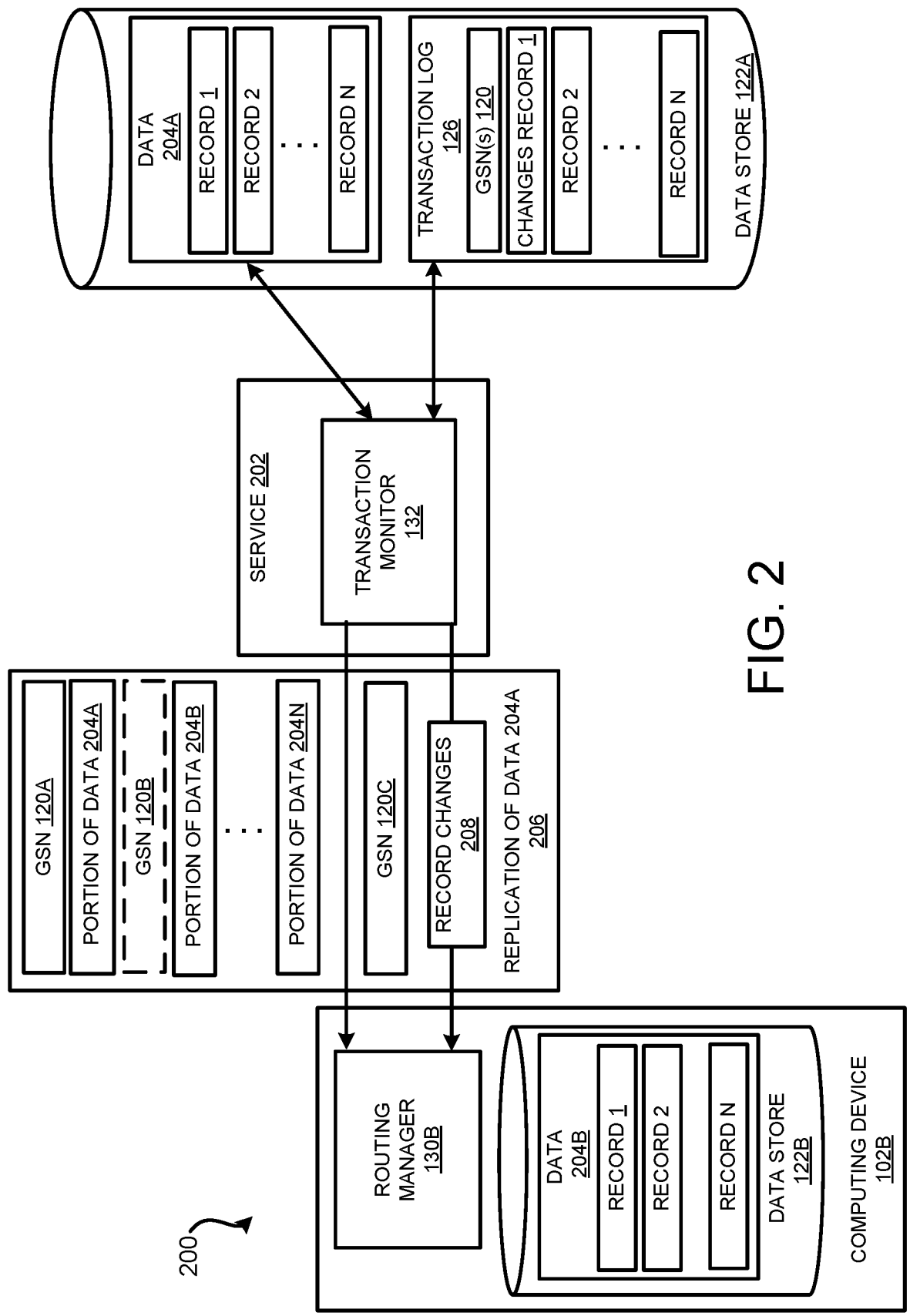
FIG. 2 is a computing system architecture depicting an illustrative operating environment in which a source computing device is using a global sequence number to help ensure that routing data that is copied to a target computing device is consistent.

FIG. 2 is a computing system architecture depicting an illustrative operating environment 200 in which a computing device 102B is using global sequence numbers 120 to ensure that data 202 that is copied to the computing device 102B is consistent. The operating environment 200 includes many of the same components illustrated in the operating environment 100 of FIG. 1.

As illustrated, environment 200 includes a service 202 that includes a transaction monitor 132, a computing device 102B that includes the routing manager 130B and the data store 122B, and a data store 122A. In the example illustrated in FIG. 2, the computing device 102B is replicating data 204A from the data store 122A to the data store 122B.

As discussed above, the data 204 may be metadata and/or other types of data used by the computing device 102B and other computing devices. In some examples, the computing device 102B uses the data 204B to determine how to route data within a network, such as the service provider network 104 or some other network. According to some examples, the data 204 is structured metadata that may be arranged within the data store 122A as a table of records, such as the records 1-N. The service 202 provides services that utilize the data 204A. While a routing service 116 is described herein, other service may utilize the GSN for replicating mutating data.

In the current example illustrated in FIG. 2, the routing manager 130B accesses the data 204A via the service 202. In other examples, the routing manager 130B may access and obtain the data 204A using other mechanisms, such as using some other computing device or component.

As discussed above, the computing device 102B obtains an initial value of the GSN 120A from the transaction log 126 via the transaction monitor 132. The GSN 120 provides an initial state of the data 204A at the time of copying. After obtaining the value of the GSN 120A, the computing device 102B begins copying the data 204A. As illustrated, the data 204A is replicated to the computing device 102B as portions of data 204A-204N. As the data 204A is received by the routing manager 130B, the routing manager 130B stores the data 204A as local data 204B within the data store 122B.

In some examples, the routing manager 130B may receive updates to the GSN 120. For instance, the GSN can be obtained after each portion of data is received as indicated by GSN 120B. The GSN might also be included with every record that is obtained by the routing manager 130B. As another example, the GSN might be obtained at the beginning of the replication and at the end of the replication, as indicated by GSN 120C.

After copying all or a portion of the data, the computing device 102B may determine if the data 204A has been mutated. In some configurations, when the value of the GSNs are different, the data 204A has been mutated. When the values of the GSN are the same, the data 204 has not changed. When the data 204A has changed, the routing manager 130B obtains record changes 208 and updates the records within the data store 122B to reflect the records stored within the data 204A.

Figure 3:
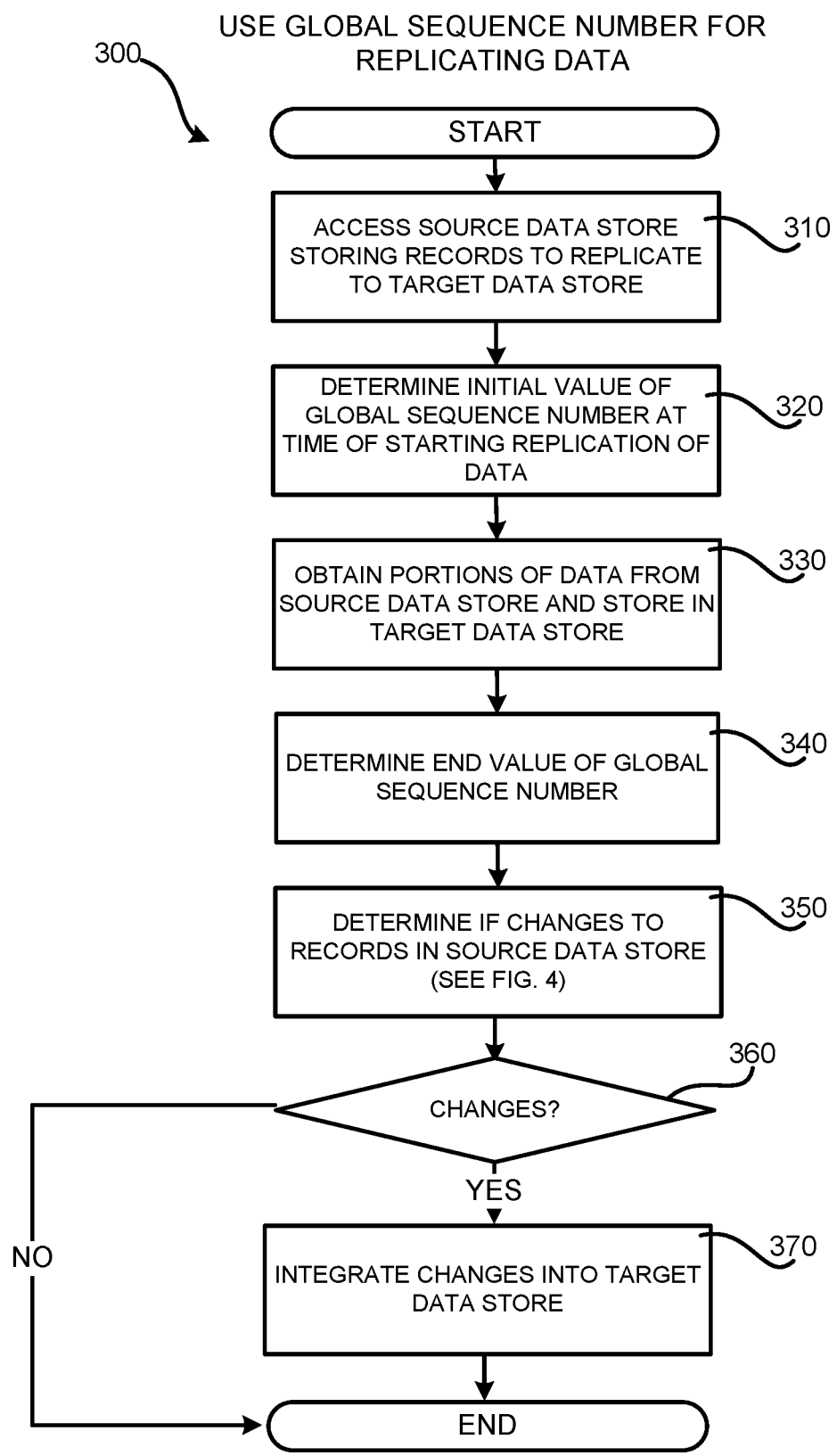
FIG. 3 is a flow diagram showing a routine illustrating aspects of a mechanism disclosed herein for using a global sequence number for replicating mutating data.
Figure 4:
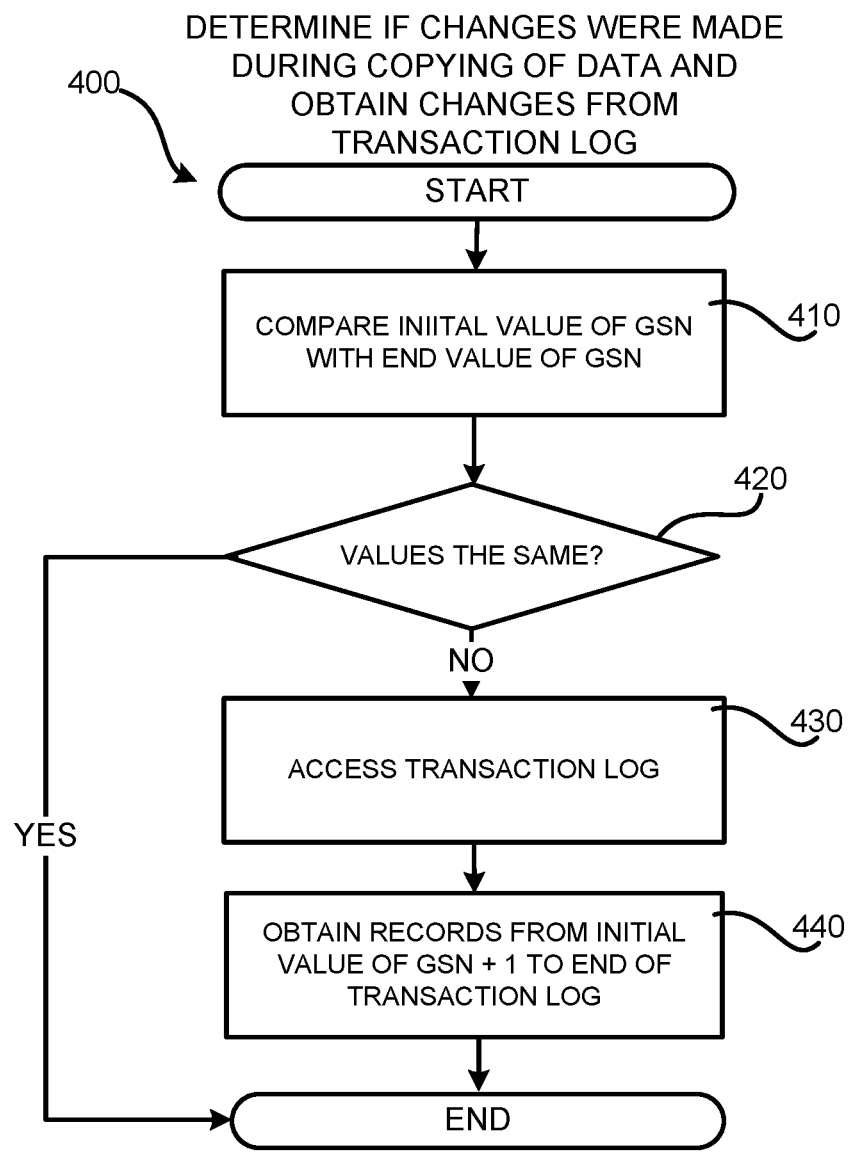
FIG. 4 is a flow diagram showing a routine illustrating aspects of a mechanism disclosed herein for determining if changes were made to the source data and obtaining the changes from a transaction log.

FIGS. 3 and 4 are flow diagrams showing routines 300 and 400, respectively, that illustrate aspects of a mechanism for using a GSN when replicating mutating data. It should be appreciated that the logical operations described herein with respect to FIG. 3, FIG. 4 and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 3 is a flow diagram showing a routine 300 illustrating aspects of a mechanism disclosed herein for using a global sequence number for replicating mutating data. The routine 300 may begin at 310, where a source data store is accessed that stores records to be replicated to a target data store. As discussed above, the source data store may be associated with a routing service that is operative to provide routing of data to a storage location. In some examples, the data to be replicated is routing metadata (e.g., routing data 118A) that describes operations and instructions on how to route data within a network. In other examples, the data may be other types of data that one or more other computing devices may utilize in addition to a source computer.

At 320, an initial value of a global sequence number 120 is determined at the time of starting replication of the data chart. As discussed above, the initial value of the global sequence number 120 may be obtained by the routing manager 130B, or the computing device 102B or some other component. The GSN 120 provides an initial state of the data to be transferred.

At 330, a portion of data is obtained from the source data store and stored in the target data store. The data to be copied can be broken into chunks of data by the routing manager 130A in order to provide limited impact to the source data store 122A. As discussed above, the routing manager 130B may obtain the data and store the data in a local data store, such as the data store 122B. In some examples, records being copied may be modified within the source data store during the time of the talking.

At 340, the end value of the global sequence number 120 is determined. The end value indicates the state of the source data at the time the copying of the data is complete. As discussed above, an end value of the GSN 120 may be determined at the end of each chunk obtained, after several chunks of been obtained, and/or at the end of receiving all chunks.

At 350, a determination is made as to whether there are changes to one or more of the records in the source data store during the copying of the data. As described in more detail below with reference to FIG. 4, the initial value of the global sequence number 120 is compared to a value of the global sequence number 120 by the routing manager 130B after the data is copied to the local data store 122B to determine if changes have been made to the data stored within the data store 122A.

At 360, a decision is made as to whether changes have been made to the source data. When changes have been made to the source data, the routine 300 moves to 360. When changes have not been made to the source data, the routine 300 moves to block.

At 370, any changes made to the source data store 122A are integrated into the data stored in the data store 122B. As discussed above, the routing manager 130B may receive the changes as deltas to the already received records from the source data store 122A. The routine 300 may then proceed to an end operation. Alternately, the routine 300 might proceed back to repeat some or all of the processing operations described above. For example, from 370, routine 300 may proceed back to 310.

FIG. 4 is a flow diagram showing a routine 400 illustrating aspects of a mechanism disclosed herein for determining if changes were made to the source data and obtaining the changes from a transaction log. The routine 400 may begin at 410, where the initial value of the GSN 120 is compared with the end value of the GSN 120. As discussed above, the values of the GSN indicate how many changes have been made to the source data store. In some configurations, the routing manager 130B compares the values of the GSN 120 obtained at different times.

At 420, a decision is made as to whether the initial value of the global sequence number 120 is the same as the end value of the global sequence number 120. As discussed above, when the routing manager 130B, or some other computing device or component, determines that the values are same, the data stored in the source data store 122A has not changed. When the values are not the same, the source data store has been changed. When the values are not the same, the routine 400 moves to 430. When the values are the same, the routine 400 moves to an end operation.

At 430, the transaction log that stores data relating to the changes made to the source data is accessed. As discussed above, the transaction monitor 132 may access the transaction log 126 to obtain changes and send them to the computing device 102B and the routing manager 130B creating a local copy of the source data.

At 440, the records that have been changed within the transaction log 126 are accessed and obtained. As discussed above, the records obtained include the records from the global sequence number plus one to the end of the transaction log 126. The routine 400 may then proceed to an end operation. Alternatively, the routine 400 might proceed back to repeat some or all of the processing operations described above. For example, from 440, routine 400 may proceed back to 410.

Figure 5:
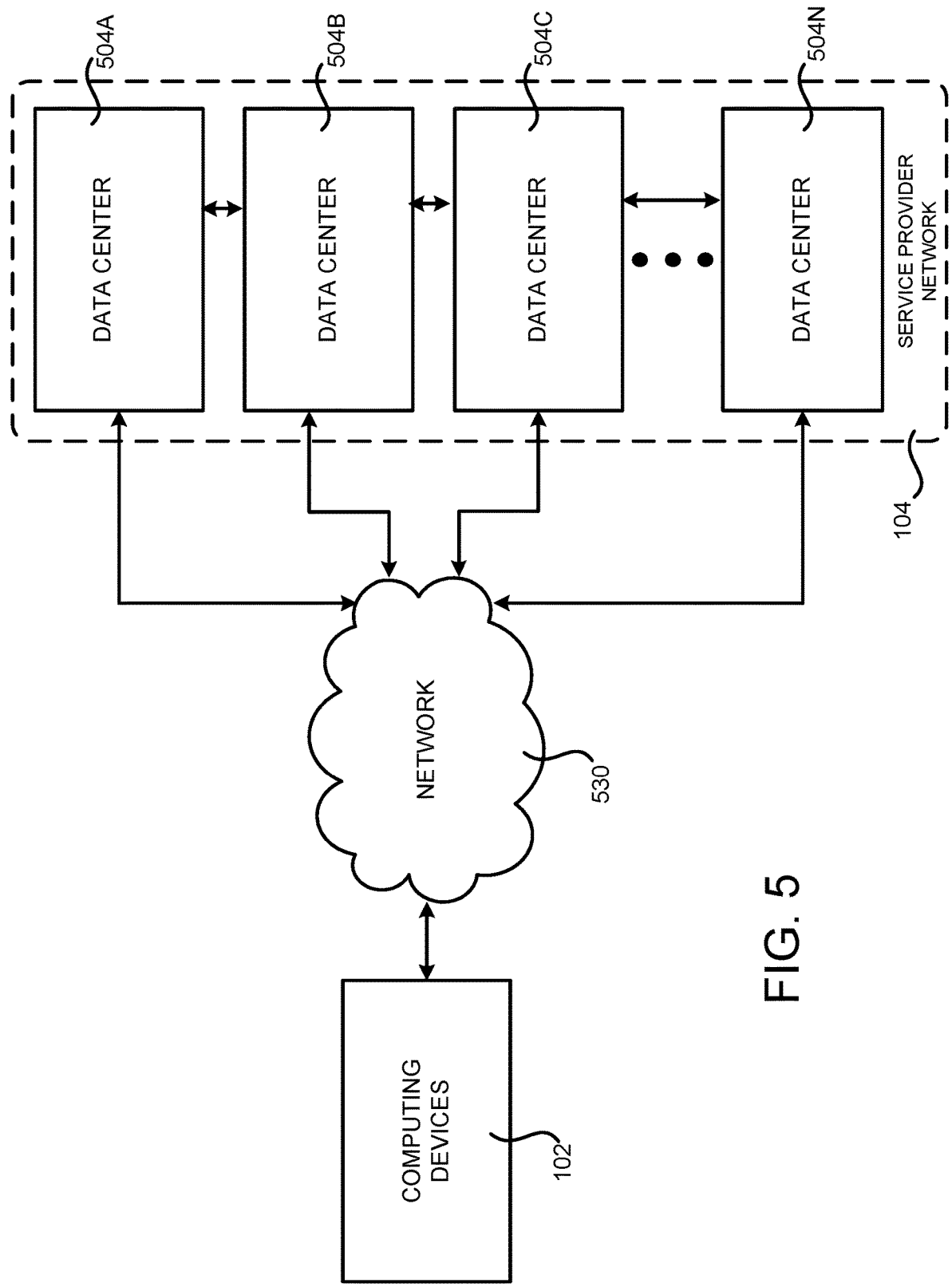
FIG. 5 is a system and network diagram that shows one illustrative operating environment for the examples disclosed herein that includes a service provider network.

FIG. 5 and the following description are intended to provide a brief, general description of a suitable computing environment in which the examples described herein may be implemented. In particular, FIG. 5 is a system and network diagram that shows an illustrative operating environment that includes a service provider network 104. As discussed above, the service provider network 104 can provide virtual machine instances and computing resources on a permanent or an as-needed basis.

The computing resources provided by the service provider network 104 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 104 are enabled in one implementation by one or more data centers 504A-504N (which may be referred to herein singularly as "a data center 504" or collectively as "the data centers 504"). The data centers 504 are facilities utilized to house and operate computer systems and associated components. The data centers 504 typically include redundant and backup power, communications, cooling and security systems. The data centers 504 might also be located in geographically disparate locations. One illustrative configuration for a data center 504 that implements some or all of the concepts and technologies disclosed herein for annotating resources in the service provider network 104 will be described below with regard to FIG. 6.

The users and customers of the service provider network 104 may access the computing resources provided by the data centers 504 over a suitable data communications network, such as a Wide Area Network ("WAN"), as illustrated by network 530. Although a WAN might be used, it should be appreciated that a local-area network ("LAN"), the Internet, or any other networking topology known in the art that connects the data centers 504 to the computing devices 102 may be utilized. It should also be appreciated that combinations of such networks might also be utilized.

Figure 6:
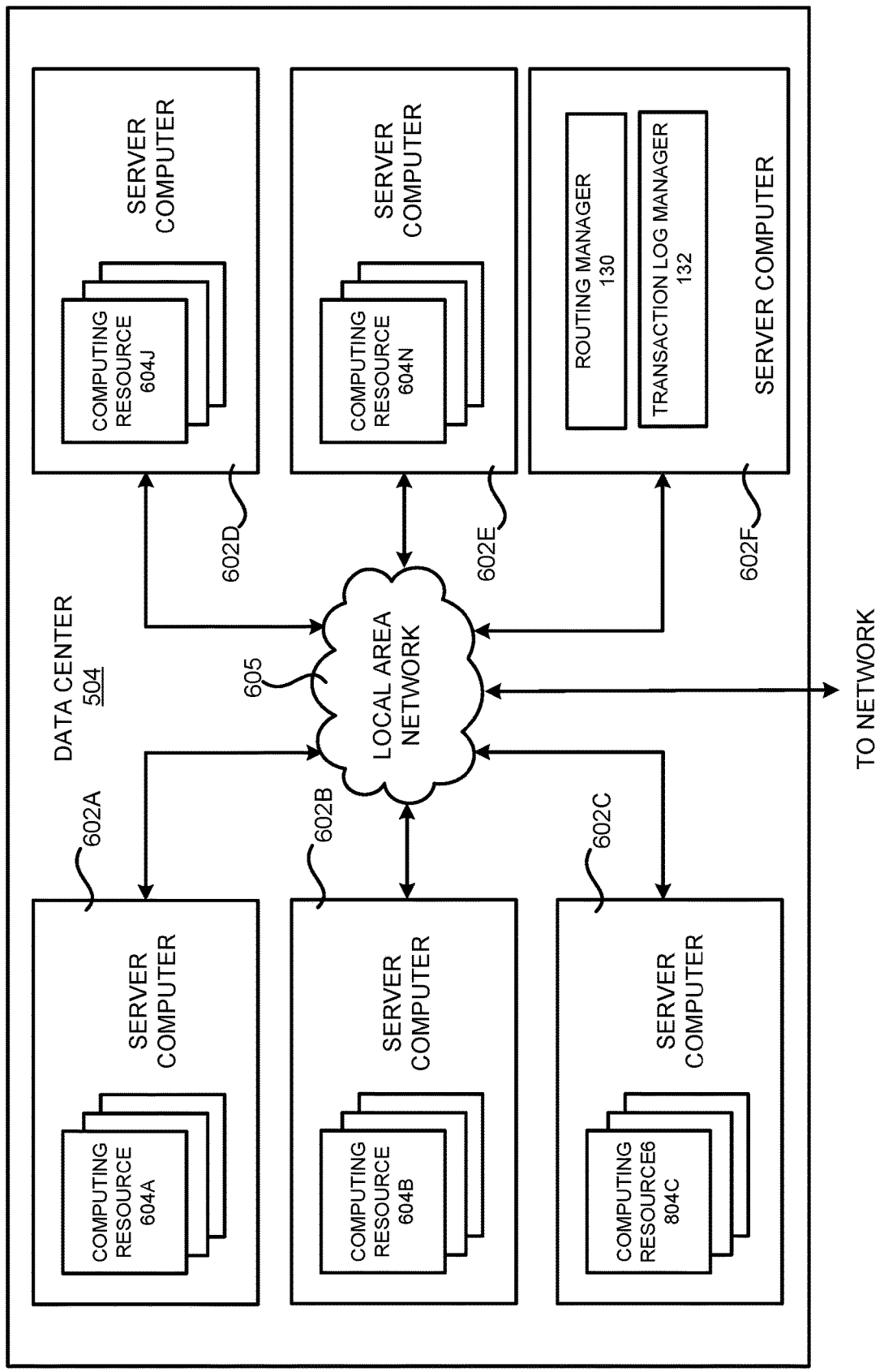
FIG. 6 is a computing system diagram that illustrates one configuration for a data center that implements aspects of a service provider network, including some or all of the concepts and technologies disclosed herein for using a global sequence number for replicating mutating data.

FIG. 6 is a computing system diagram that illustrates one configuration for a data center 504 that implements aspects of a service provider network 104, including some or all of the concepts and technologies disclosed herein for using a GSN in replicating mutating data. The example data center 504 shown in FIG. 6 includes several server computers 602A-602F (which may be referred to herein singularly as "a server computer 602" or in the plural as "the server computers 602") for providing computing resources. The server computers 602 may be standard tower or rack-mount server computers configured appropriately for providing the computing resources described herein. According to an example, the server computers 602 are configured to execute the software products as described above.

In one example, some of the computing resources 604 are virtual machine instances. As known in the art, a virtual machine instance is an instance of a software implementation of a machine (i.e. a computer) that executes programs like a physical machine. Each of the server computers 602 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 602, for example.

The data center 504 shown in FIG. 6 also includes a server computer 602F reserved for executing software components for managing the operation of the data center 504, the server computers 602, virtual machine instances, and other resources within the service provider network 104. The server computer 602F might also execute the routing manager 130 and the transaction monitor 132. Details regarding the operation of each of these components has been provided above. In this regard, it should be appreciated that while these components are illustrated as executing within the service provider network 104, computing systems that are external to the service provider network 104 might also be utilized to execute some or all of these components. Other configurations might also be utilized.

In the example data center 504 shown in FIG. 6, an appropriate local area network ("LAN") 605 is utilized to interconnect the server computers 602A-602E and the server computer 602F. The LAN 605 is also connected to the network 530 illustrated in FIG. 5. It should be appreciated that the configuration and network topology illustrated in FIGS. 5 and 6 has been greatly simplified and that many more computing systems, networks and networking devices may be utilized to interconnect the various computing systems disclosed herein. Appropriate load balancing devices or software modules might also be utilized for balancing a load between each of the data centers 504A-504N, between each of the server computers 602A-602F in each data center 504 and between virtual machine instances and other types of computing resources provided by the service provider network 104.

It should be appreciated that the data center 504 described in FIG. 6 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 7:
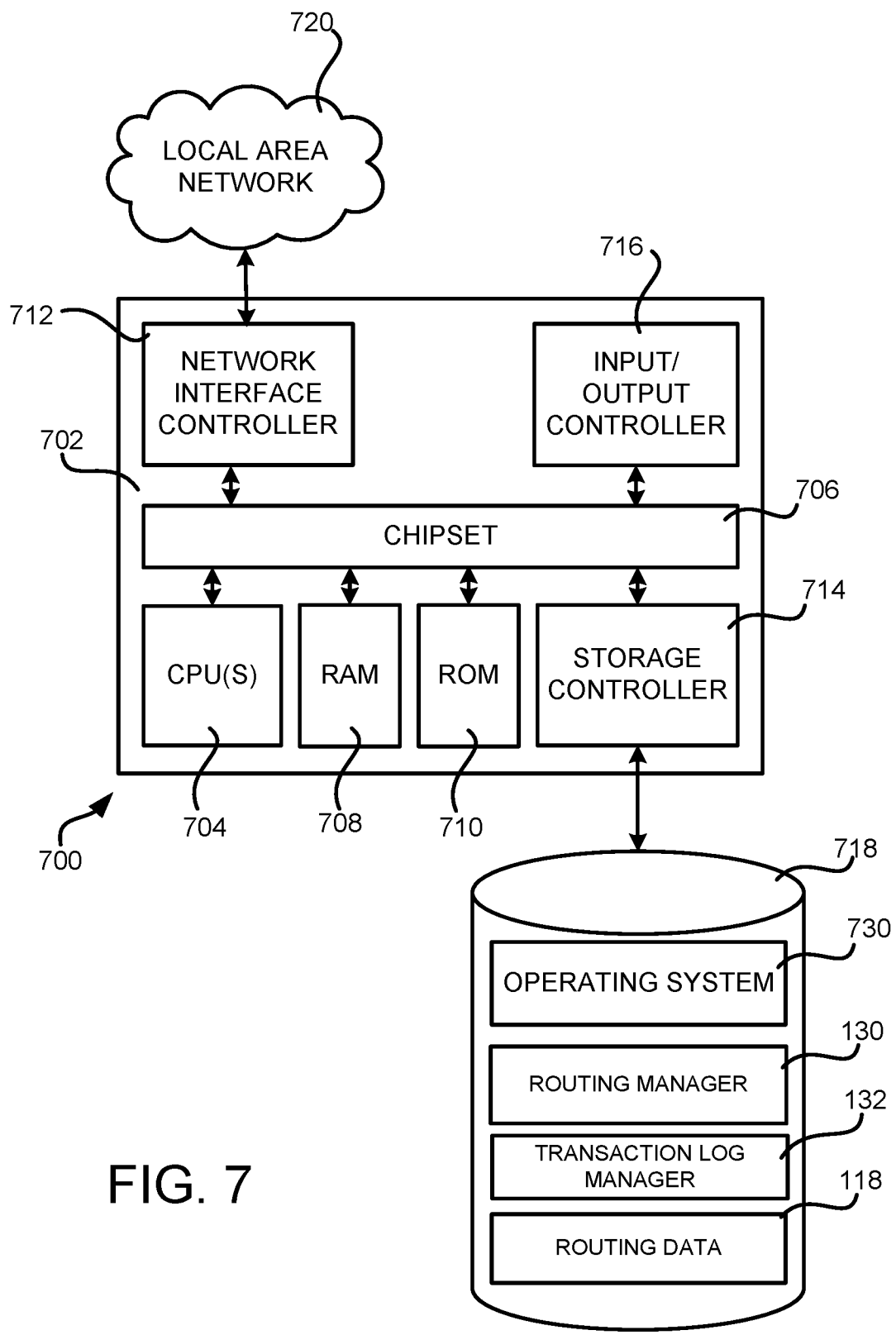
FIG. 7 is a computer architecture diagram showing one illustrative computer hardware architecture for implementing a computing device that might be utilized to implement aspects of the various examples presented herein.

FIG. 7 shows an example computer architecture for a computer 700 capable of executing program components for using a GSN for replicating metadata in the manner described above. The computer architecture shown in FIG. 7 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 7 may be utilized to execute software components for performing operations as described above. The computer architecture shown in FIG. 7 might also be utilized to implement a computing device 102 or any other of the computing systems described herein.

The computer 700 includes a baseboard 702, or "motherboard," which is a printed circuit board to which a multitude of components or devices may be connected by way of a system bus or other electrical communication paths. In one illustrative example, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the examples described herein.

The computer 700 may operate in a networked environment using logical connections to remote computing devices and computer systems through a network, such as the local area network 720. The chipset 706 may include functionality for providing network connectivity through a network interface controller ("NIC") 712, such as a gigabit Ethernet adapter. The NIC 712 is capable of connecting the computer 700 to other computing devices over the local area network 720. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one example, the operating system comprises the LINUX operating system. According to another example, the operating system comprises the WINDOWS® SERVER operating system from MICROSOFT Corporation. According to further examples, the operating system may comprise the UNIX operating system. It should be appreciated that other operating systems may also be utilized. The mass storage device 718 may store other system or application programs and data utilized by the computer 700, such as components that include the routing manager 130, the transaction log manager 132 and the routing data 118 and/or any of the other software components and data described above. The mass storage device 718 might also store other programs and data not specifically identified herein.

In one example, the mass storage device 718 or other computer-readable storage media is encoded with computer-executable instructions that, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the routines described above with regard to FIGS. 3-4. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 9.

Based on the foregoing, it should be appreciated that technologies for using a global sequence number for replicating mutating data have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A computer-implemented method, comprising:
accessing, from a first computing device within a network, a data store of a second computing device within the network, the data store including routing data that includes routing instructions indicating how to route data within the network;
determining, from a global sequence number (GSN), a first value that identifies a number of mutations to the routing data, wherein the GSN is updated for individual changes to the routing data;
obtaining, from the data store of the second computing device during a first time period, a first portion of the routing data, the first portion of the routing data including a first number of records;
storing the first portion of the routing data within a local data store of the first computing device;
determining a second value of the GSN that identifies a current number of mutations to the routing data after obtaining the first portion of the routing data;
determining that the first value is not equal to the second value;
obtaining changes made to the routing data;
applying the changes to the first portion of the routing data stored within the local data store of the first computing device;
determining a third value of the GSN;
determining that the second value is equal to the third value;
determining that the first portion of the routing data stored within the local data store of the first computing device is consistent with the routing data stored within the data store of the second computing device; and
at least in response to determining that the first portion of the routing data stored within the local data store of the first computing device is consistent with the routing data stored within the data store of the second computing device, utilizing the first computing device in addition to the second computing device to perform routing operations using the routing data stored within the local data store of the first computing device and the routing data stored within the data store of the second computing device.

2. The computer-implemented method of claim 1, further comprising obtaining the GSN from a transaction monitor that monitors changes to the routing data stored in the data store.

3. The computer-implemented method of claim 1, wherein the routing data stored by second computing device is used by a plurality of computing devices for routing data within the network.

4. The computer-implemented method of claim 1, wherein applying the changes to the first portion of the routing data comprises applying the changes to one or more records within the first portion of the data stored in the local data store.

5. The computer-implemented method of claim 4, further comprising determining the one or more records based, at least in part, on transactions identified within a transaction log.

6. The computer-implemented method of claim 1, wherein the first computing device and the second computing device execute within a service provider network that provides data storage services.

7. A system, comprising:
a first computing device executing within a network, the first computing device performing operations to store data in a first data store, the data including records utilized by a plurality of computing devices within the network to perform a service, wherein the plurality of computing devices includes the first computing device; and
a second computing device executing within the network, the second computing device performing operations to:
determine, at a first time, a first value associated with a number of mutations to the data within the first data store,
obtain, from the first data store during a first time period, a first portion of the data, the first portion of the data including a first number of records,
store the first portion of the data within a second data store that is local to the second computing device,
determine a second value associated with a number of the mutations to the data within the first data store at a second time,
compare the first value to the second value,
obtain changes made to the first data store during the first time period based, at least in part, on the comparison,
apply the changes to the first portion of the data stored within the second data store, and
utilize the second computing device in addition to the first computing device to perform computer operations associated with the service using at least a portion of the data stored within the first data store and the first portion of the data stored within the second data store.

8. The system of claim 7, wherein determine the first value and the determine second value comprises obtaining a current value of a global sequence number (GSN) that identifies a mutation state of the first data store, the GSN stored within the first data store.

9. The system of claim 7, wherein compare the first value to the second value comprises determining that the first value is not equal to the second value and wherein obtain the changes comprises obtaining changes to the records within the first portion of the data based, at least in part, on a difference in value between the first value and the second value.

10. The system of claim 7, wherein the second computing device performs further actions to:
  determine a third value associated with a number of mutations to the data within the first data store at a third time;
  determine that the second value is equal to the third value; and
  determine that the first portion of the data stored within the second data store is consistent with the data stored within the first data store.

11. The system of claim 7, further comprising a transaction log and a transaction monitor, the transaction log storing changes to one or more of the records and the transaction monitor updating a value of a GSN that identifies a mutation state of the first data store at least partly in response to a detection of a change to an individual record stored within the first data store.

12. The system of claim 11, wherein the second computing device is further configured to obtain a current value of the GSN from the transaction log.

13. The system of claim 7, wherein the data includes records that identify how to route data within the network.

14. The system of claim 7, wherein the second computing device is further operative to parse one or more of the records within the first portion of data to identify a current value of a global sequence number (GSN) that identifies a mutation state of the first data store.

15. The system of claim 7, wherein the first computing device and the second computing device provide routing services to route data received from a computing device external to the network.

16. A non-transitory computer-readable storage medium having computer-executable instructions stored thereupon which, when executed by a computer, cause the computer to:
  determine a first value associated with a number of mutations to data stored within a first data store at a first time, the first data store external to the computer and wherein the data includes records utilized by a plurality of computing devices within a service provider network to perform a service;
  obtain, from the first data store during a first time period, a first portion of the data, the first portion of the data including a first number of records;
  store the first portion of the data within a second data store local to the computer;
  determine a second value associated with a number of the mutations to the data within the first data store at a second time;
  compare the first value to the second value;
  obtain changes made to the first data store at least during the first time period based, at least in part, on the comparison;
  apply the changes to the first portion of the data stored within the second data store; and
  utilize the first portion of the data stored within the second data store in addition to the data stored within the first data store to perform one or more computer operations associated with the service.

17. The non-transitory computer-readable storage medium of claim 16, wherein determine the first value and the determine second value comprises obtaining a current value of a global sequence number (GSN) that identifies a mutation state of the first data store, the GSN stored within the first data store.

18. The non-transitory computer-readable storage medium of claim 16, wherein the instructions further cause the computer to obtain, from a transaction log, a current value of a GSN.

19. The non-transitory computer-readable storage medium of claim 18, wherein obtain changes made to the first data store comprises to obtain records indicated to be changed based, at least in part, on the GSN.

20. The non-transitory computer-readable storage medium of claim 16, wherein the instructions further cause the computer to route data received from an external computing device to a storage location within the service provider network using records stored within the second data store.

* * * * *